(12) United States Patent
Hisakado et al.

(10) Patent No.: US 6,236,629 B1
(45) Date of Patent: May 22, 2001

(54) OPTICAL DISK DEVICE

(75) Inventors: Yuji Hisakado, Daito; Toshiya Akagi, Neyagawa; Yukihiro Yamasaki, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/694,016

(22) Filed: Oct. 23, 2000

(30) Foreign Application Priority Data

Oct. 27, 1999 (JP) .................................................. 11-305029

(51) Int. Cl.$^7$ ....................................................... G11B 7/00
(52) U.S. Cl. ...................... 369/47.32; 369/47.28; 369/53.34
(58) Field of Search ............................ 369/47.36, 47.48, 369/47.3, 53.34, 47.28

(56) References Cited

U.S. PATENT DOCUMENTS 6,081,490 * 6/2000 Kuroda et al. .......................... 369/47

FOREIGN PATENT DOCUMENTS

| 10-91967 | 4/1998 | (JP) . |
| 10-289525 | 10/1998 | (JP) . |
| 11-203681 | 7/1999 | (JP) . |

* cited by examiner

*Primary Examiner*—Nabil Hindi
(74) *Attorney, Agent, or Firm*—Parkhurst & Wendel, L.L.P.

(57) ABSTRACT

An optical disk is operated in a ZCLV system for generating a stable and precise clock and the operation proceeds with a speed change of a high-speed motor when data is stored with the motor accelerated or decelerated at a high speed to improve accessibility for data storage. The optical disk includes: a disk rotator for rotating the optical disk at an optional number of rotations; a rotation controller for controlling rotation of the optical disk; a wobble extractor for extracting wobbling on the track of the optical disk; a clock extractor for extracting a clock element from the wobbling; a speed detector for detecting a linear speed of the optical disk; and a response switch for switching a response of the clock extractor, in which the response of the clock extractor is switched depending on the linear speed of the optical disk.

9 Claims, 4 Drawing Sheets

OPTICAL DISK DEVICE

FIELD OF THE INVENTION

The present invention relates to an optical disk device.

BACKGROUND OF THE INVENTION

Data is normally written to a writable optical disk using a fixed and stable clock such as crystal, a frequency synthesizer or the like. This holds true with all formats such as a CAV format in which the number of rotations and the transfer rate are constant on the whole surface of a disk, a ZCAV format in which the number of rotations is constant while the transfer rate depends on the radius of a disk, a ZCLV format in which the number of rotations depends on the radius of a disk while the transfer rate is constant.

Among the above mentioned formats, the ZCLV format is adopted for a phase shift optical disk such as DVD-RAM, because the linear speed for storage is an important factor of the storage characteristic, and data cannot be normally stored unless the linear speed is in a predetermined range.

Thus, access for storage in the ZCLV format as mentioned above largely depends on the settings of a motor. Therefore, the access for storage has been improved by allowing a storage clock to follow the change in the operation of a motor.

The physical disk format for the DVD-RAM is described in the DVD-RAM standards (DVD Specifications for Rewritable Disc, Part 1: PHYSICAL SPECIFIC ACTIONS Ver. 1.0).

In the DVD-RAM format, wobbling is applied to the guide groove of a disk at a frequency of one 186th of the channel rate of data. The wobbling is a reference signal. A channel clock is generated by a phase synchronization loop (PLL) for multiplying the frequency element by 186, and the storage and read system is configured based on the channel rate variable depending of the rotation state of the disc, thereby improving the access time and the like of the system.

When data is read, it is necessary to generate a gate for correctly indicating the starting position of an address area and address data, the starting position of stored data, and the like. A channel clock generated at the above mentioned PLL is set as a clock for generation of a gate so that a gate can be correctly and correspondingly generated even when the rotation state of a motor changes and a channel rate also changes.

In addition, when data is written to a disk, it is necessary to store the correct length of data at a correct position by absorbing a channel rate error caused by a motor rotation error and a disk center error. In this case, correct data can be written by generating storage data using a channel clock generated based on the PLL as a storage clock as a countermeasure against a motor rotation error and a disk center error.

With an optical disk in the above mentioned ZCLV system, well-known jitter-free read and jitter-free storage have been utilized so that data can be read and stored even in a state where the motor acceleration is high and the transfer rate is changing, thereby to improve the access speed for storage and reading.

Furthermore, to increase a storage capacity, a higher storage density and a higher frequency storage clock have been developed.

Under the situation, a high-speed PLL characteristic should be guaranteed to proceed with high-speed motor acceleration.

In addition, it is also necessary for the PLL to generate a clock with high frequency precision by standing the disturbance, being stable at a low speed with little possible clock jitter when data is stored.

That is, a PLL is required to be a fast-response PLL for proceeding with the changing speed of a high-speed motor and a slow-response PLL for generating a stable storage clock.

SUMMARY OF THE INVENTION

To solve the above mentioned problems, the optical disk device of the present invention includes: disk rotation means for rotating an optical disk at optional number of rotations; rotation control means for controlling the rotation of an optical disk; frequency extract means for extracting the frequency elements of a reference signal provided on the track of an optical disk; clock extract means for extracting the clock elements from a reference signal; speed detection means for detecting the linear speed of an optical disk; and response switch means for switching the response of the clock extract means.

In addition, the optical disk device includes rotation detection means for detecting the number of rotations of an optical disk.

According to the optical disk device of the present invention, in a disk rotation number variable system which extracts a storage clock from wobbling elements applied on the track of an optical disk, a clock extracting PLL can proceed with a high-speed operation with a variable linear speed by a high-speed rotation change, and can realize a system stable against disturbance when a variable linear speed is detected due to a low-speed rotation change and a disk center error, and data is stored on an optical disk.

DESCRIPTION OF THE EMBODIMENTS

Described below in detail are embodiment of the present invention.

Figure 1:
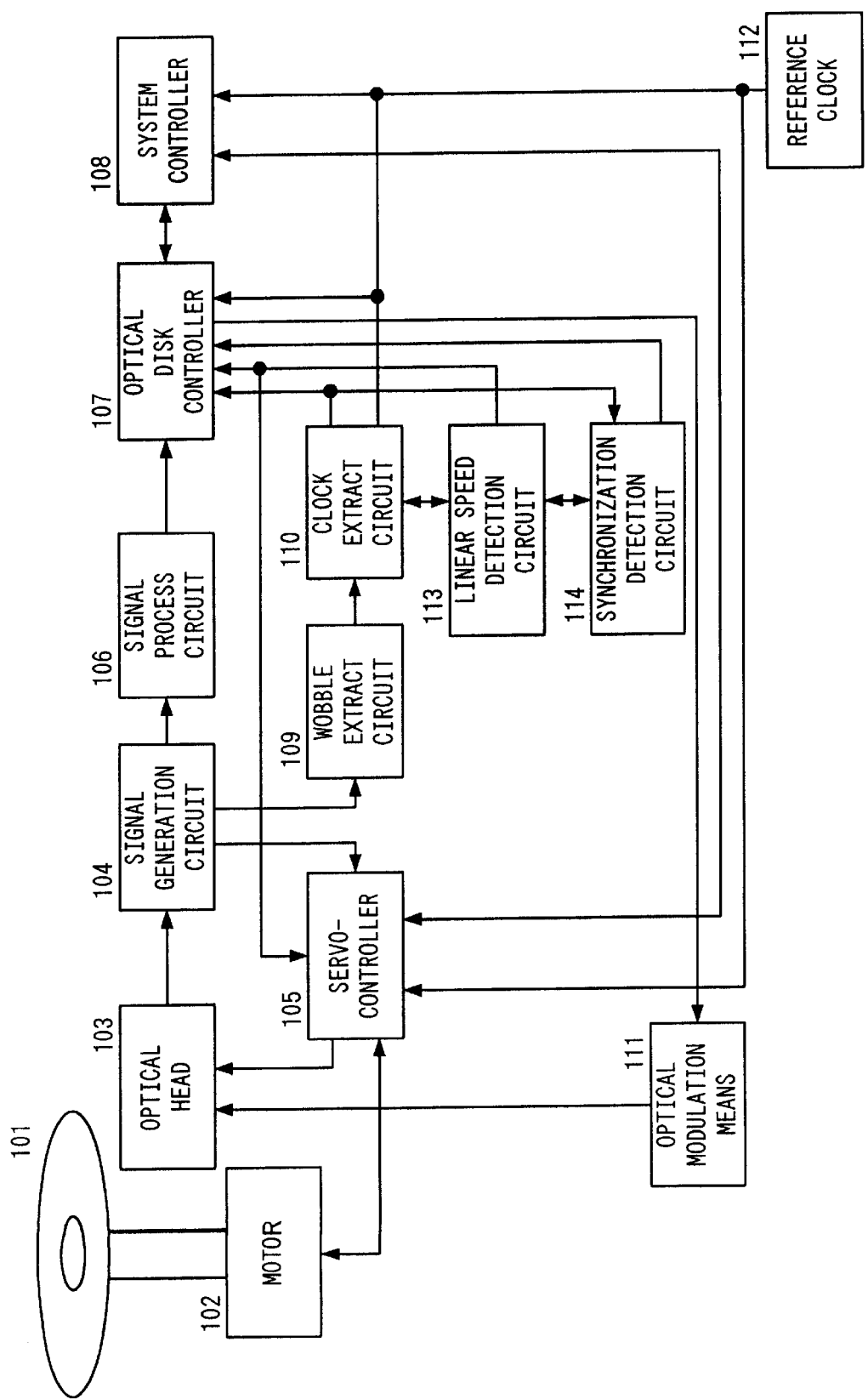
FIG. 1 is a block diagram of the configuration of an optical disk device according to an embodiment of the present invention.

FIG. 1 is a block diagram of the configuration of the optical disk device according to an embodiment of the present invention. In FIG. 1, reference numeral 101 denotes an optical disk for storing data such as DVD-RAM. Reference numeral 102 denotes a motor. Reference numeral 103 denotes an optical head provided with an optical radiation means such as a semiconductor laser, a focus and tracking actuator, and an optical detector for detecting a return light from the optical disk 101. Reference numeral 104 denotes a signal generation circuit for generating a focus error signal (FE signal) from a signal of the optical head 103, a tracking error signal (TE signal), and a data signal (RF signal) stored on the optical disk 101. Reference numeral 105 denoted a servo-controller for controlling the optical head 103 and the motor 102. Reference numeral 106 denotes a signal process circuit for extracting read data from an RF signal. Reference numeral 107 denotes an optical disk controller for demodulating read data and modulating stored data. Reference numeral 108 denotes a system controller for controlling a device. Reference numeral 109 denotes a wobble extract circuit for extracting the elements of the wobbling applied on the track of the optical disk 101. Reference numeral 110 denotes a clock extract circuit for extracting a clock from the elements of the wobble. Reference numeral 111 denotes an optical modulation means for modulating the optical radiation means of the optical head 103. Reference numeral 112 denotes a reference clock realized by crystal, or the like for providing a reference clock specific to a system controller and clock extract means.

According to this embodiment, DVD-RAM 2.6 GB is described in detail below as an example.

The block diagram shown in FIG. 1 is described below with the flow of signals.

The servo-controller 105 controls the motor 102 to rotate the optical disk 101. It also controls the optical head 103 to converge optical beams on the rotating optical disk 101 for scanning on the track. An FE signal and a TE signal are used to make the optical beams converge and scan data on the track. The servo-controller 105 controls the rotation of the motor 102 such that the linear speed of the optical disk 101 can be substantially constant depending on the position of the optical head 103.

DVD-RAM is divided into a plurality of zones depending on position of the radius (or depending on a physical address position) of the optical disk 101. In each zone, the target number of rotations of the motor 102 is different. For example, the target number of rotations in the innermost zone 0 of the optical disk 101 is 39.78 Hz, and the target number of rotations in the outermost zone 23 of the optical disk 101 is 16.91 Hz.

The motor 102 is controlled by the electric current of the servo-controller 105, and realizes high-speed acceleration and deceleration by passing the current forward for high-speed acceleration and passing the maximum current in the negative direction for high-speed deceleration. At a constant speed, it monitors a rotation synchronization signal from the motor, and control the constant number of rotations by increasing and decreasing the electric current.

An RF signal is binarized by the signal process circuit 106 for separating data, and is demodulated by the optical disk controller 107, thereby obtaining read data.

On the track of the optical disk 101, the wobbling according to the DVD-RAM standards are applied.

From the TE signal, a single wobble element applied on the track of the optical disk 101 is superposed. The wobble extract circuit 109 extracts only a wobble element for binarization. The binarized wobble signal extracts a clock obtained by the clock extract circuit 110 multiplying it by the wobble element. The multiplied clock corresponds to a channel clock of the data stored on the optical disk 101.

When data is stored on the optical disk 101, the optical disk controller 107 generates storage data obtained by modulating data according to the clock extracted by the clock extract circuit 110, and transmits the result to the optical modulation means 111. The optical modulation means 111 modulates the optical intensity of the optical radiation means of the optical head 103 according to the storage data, and stores the data on the optical disk 101.

The system controller 108 controls a device by instructing the optical disk controller 107 to read and store data, instructing the servo-controller 105 to perform control or the like. The reference clock 112 is provided as a clock comprising an oscillator of, for example, crystal, for operation of the system controller 108 and the optical disk controller 107, and for functioning as a clock whose linear speed is detected by the clock extract circuit 110.

The wobble extract circuit 109 specific to the present invention, the clock extract circuit 110, a linear speed detection circuit 113, and a synchronization detection circuit 114 are described below by referring to the detailed block diagram shown in FIG. 2.

Figure 2:
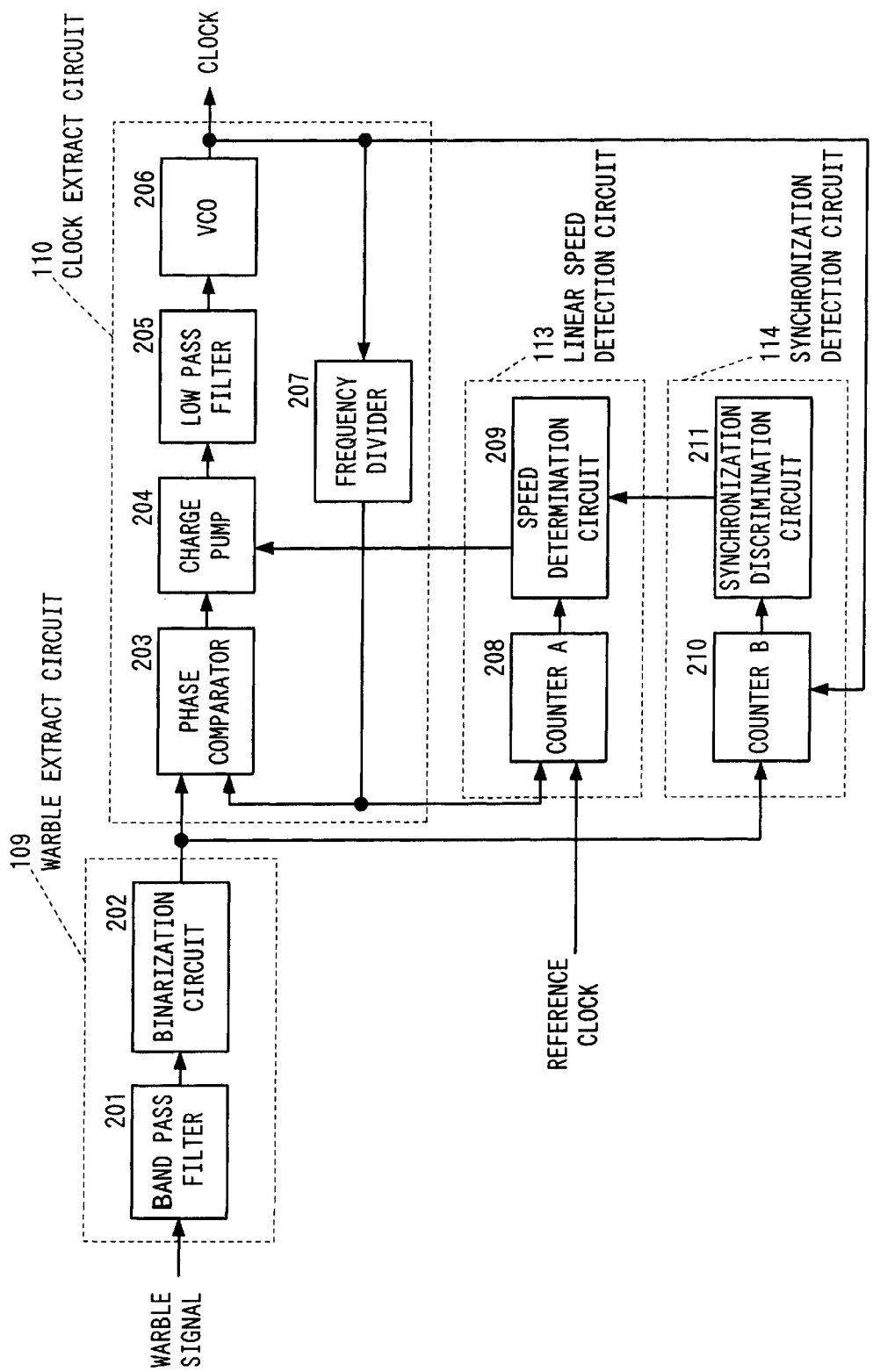
FIG. 2 is a block diagram of the details of a wobble extract circuit and a clock extract circuit.

In FIG. 2, reference numeral 201 denotes a band pass filter for passing the elements of wobble. Reference numeral 202 denotes a binarization circuit for binarizing the elements of wobble, and comprises the wobble extract circuit 109. Reference numeral 203 denotes a phase comparator for detecting the phase difference between a binarized wobble signal and a clock frequency division signal. Reference numeral 204 denotes a charge pump for receiving or providing an electric current depending on the phase error. Reference numeral 205 denotes a low pass filter for transforming the electric current of the charge pump 204 into a voltage for smoothing. Reference numeral 206 denotes a voltage control oscillator (VCO) for oscillation based on an output voltage of the low pass filter 205. Reference numeral 207 denotes a frequency divider for dividing a frequency of the output clock of the VCO 206 into the frequency of the element of wobble, thereby forming the clock extract circuit 110. Reference numeral 208 denotes a counter for counting the period of the frequency divider 207 using a reference clock. Reference numeral 209 denotes a speed determination circuit for determining the linear speed based on the result of the counter A 208, thereby forming the linear speed detection circuit 113. Reference numeral 210 denotes a counter B for counting the binarized wobble signal using a VCO 206 output clock. Reference numeral 211 denotes a synchronization discrimination circuit for discriminating the synchronization state of a phase synchronization loop (PLL) based on the result of the counter B, thereby forming the synchronization detection circuit 114.

The phase of a binarized wobble signal extracted and binarized by the wobble extract circuit 109 is compared by the phase comparator 203 with the phase of the frequency-divided clock obtained by dividing the VCO 206 by N, and the phase error between the two is output to the charge pump 204. The charge pump 204 has two or more types of current values, and the current values can be switched to each other at an instruction of the linear speed detection circuit 113. When an introducing process is performed when the PLL is not in synchronism, or when the motor 102 proceeds with the high-speed acceleration or deceleration, the amount of electric current is increased, and the response of a PLL loop is raised, thereby realizing high-speed introduction and high-speed proceeding. The PLL smoothes the output of the charge pump 204 by a voltage conversion through the low pass filter 205, the VCO 206 oscillates the result as a control voltage, thereby generating as a channel clock a clock by multiplying a wobble signal by N.

Described below is the procedure of switching the response of the PLL. In this example, for simple explanation, only the procedure of moving the optical head 103 from an inner track to outer track of the optical disk 101 is described.

Figure 3:
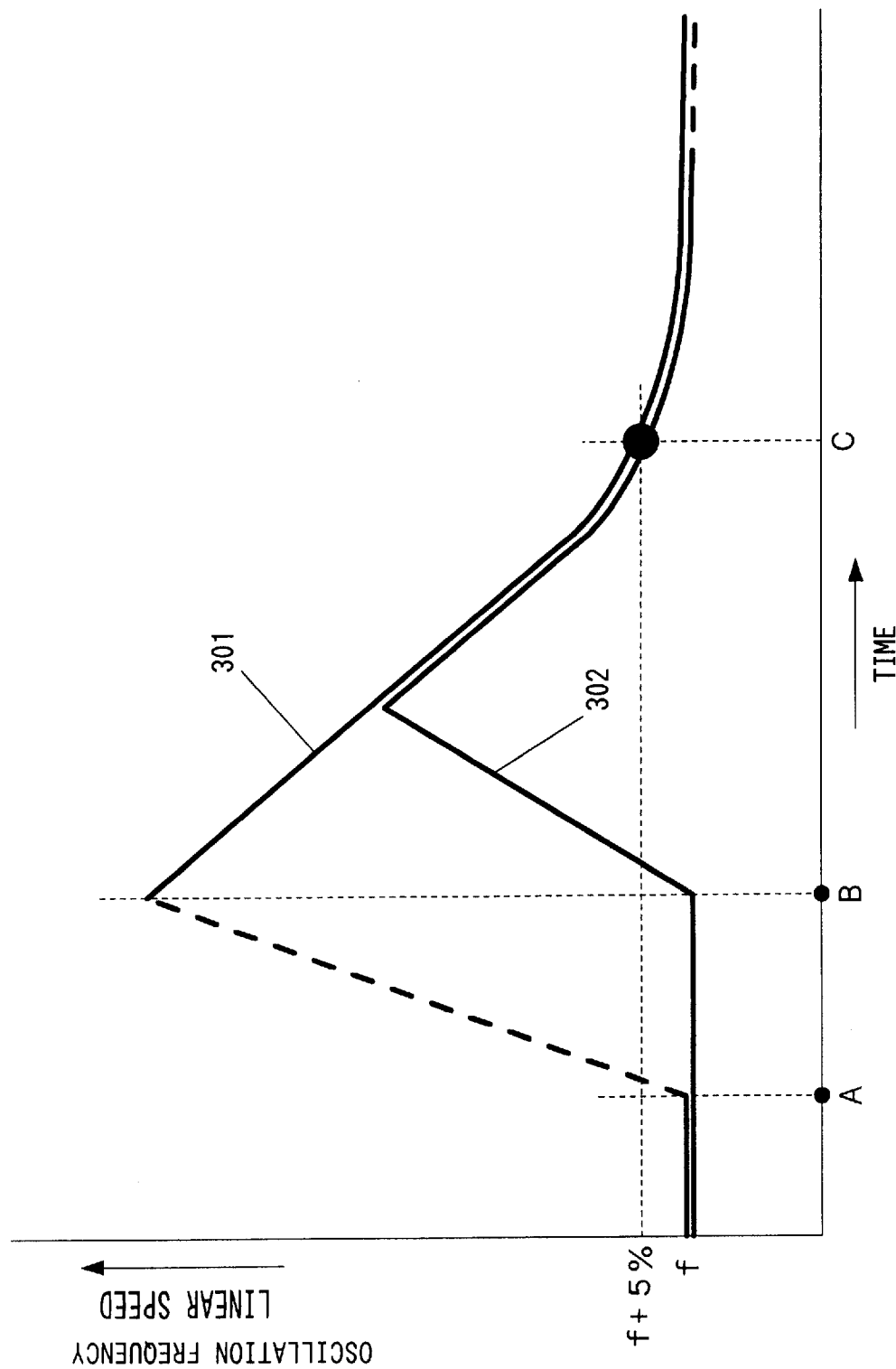
FIG. 3 shows a position at which a response switching position is set when the linear speed changes according to the present invention.

FIG. 3 shows the linear speed and the oscillation frequency when the optical head 103 moves from an inner track to outer track of the optical disk. The vertical axis indicates the linear speed and the oscillation frequency of the PLL, and the horizontal axis indicates a time.

The point A shown in FIG. 3 indicates the starting point of the movement of the optical head 103, and the point B indicates the end point. A curve 301 indicates the linear speed by the movement of the motor 102. A curve 302 indicates the oscillation frequency (=control voltage of VCO) of the PLL. The point f indicates a linear speed which is a standard transfer rate in storage reading of the device according to the present invention. The point C indicates, for example, the point (f1) where the linear speed and the oscillation frequency become higher than the standard transfer rate by +5%. The first linear speed which does not affect the storage characteristic when data is stored on the optical disk 101, and the linear speed change rate at this time also does not affect the storage characteristic. At this point, data can be written to the optical disk 101.

Figure 4:
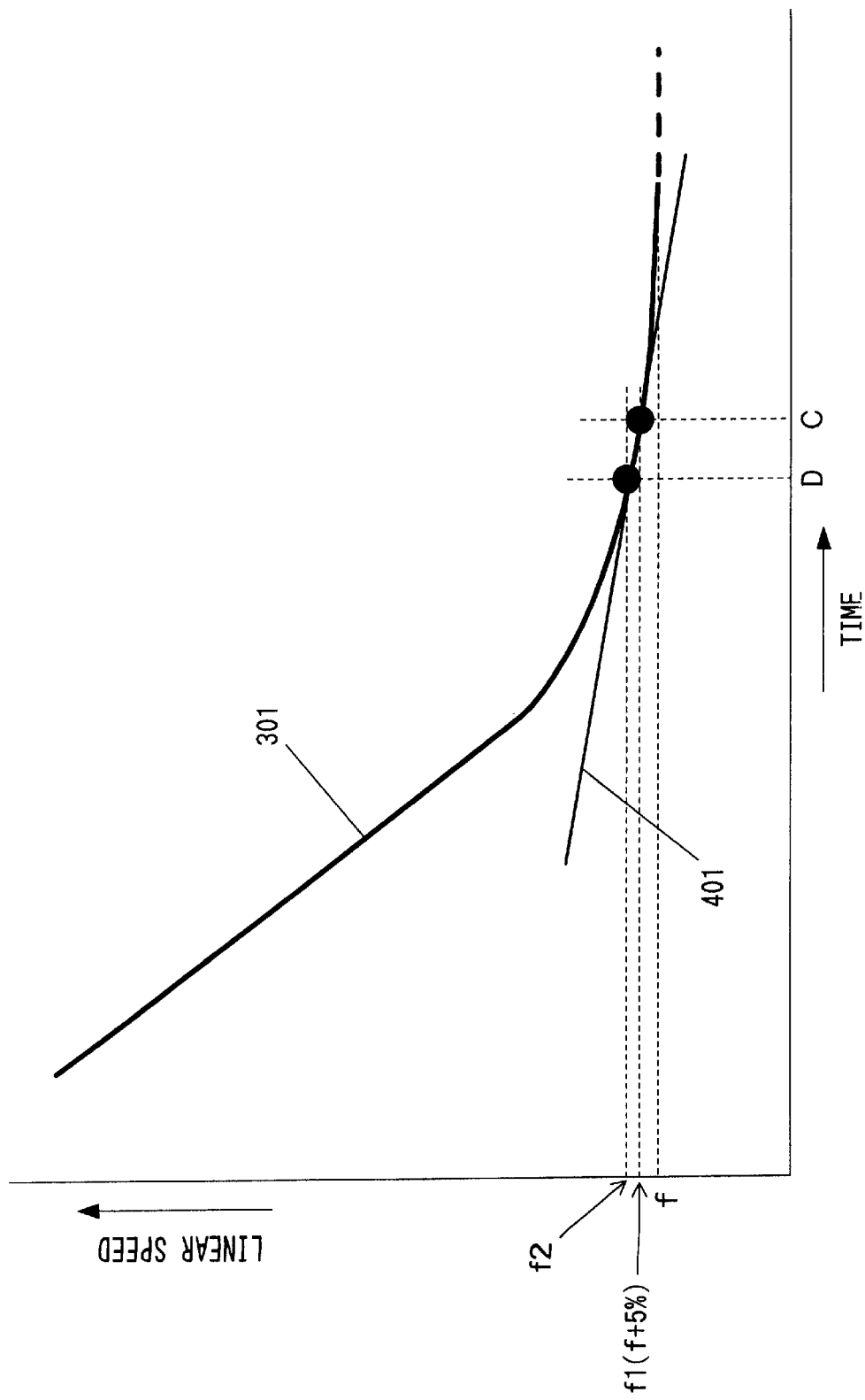
FIG. 4 shows the concept of the linear speed change rate.

The linear speed change rate is equal to the change rate of the curve 301, and can be expressed by the inclination of a tangent 401 of the curve 301 indicating the linear speed as shown in FIG. 4. Assuming that the linear speed at the time point D immediately before the point C is f2, the following approximation exists.

linear speed change rate=(f1−f2)/(C−D)

When the optical head 103 starts moving at the point A, the servo-controller 105 simultaneously controls the motor 102, and starts decelerating the rotation. However, since the motor 102 is normally set after the optical head 103 starts moving, the number of rotation of the motor is larger than the target number of rotations at the point B where the optical head 103 has completed its movement, and the motor still continues its deceleration toward the point f. At this time, the linear speed is high, and the linear speed change rate indicates a large negative value.

Subsequently, when the motor 102 approaches the target number of rotations to a certain extent, it reduces the deceleration speed toward the target number of rotations by the servo-controller 105 reducing the amount of the electric current applied to the motor 102.

The timing of a deceleration or acceleration speed can be determined when the difference between the target number of rotations and the current number of rotations, which can be detected by comparing the rotation synchronization signal from the motor with the clock of the reference clock 112, for example, becomes smaller than 10% of the target number of rotations in each zone. At this timing, the servo-controller 105 reduces the amount of the electric current applied to the motor 102, thereby lowering the speed.

Otherwise, the acceleration/deceleration speed can be set by the linear speed detected by the linear speed detection circuit 113.

The PLL starts being introduced from the point B because the wobble signal is not reliable during the movement of the optical head 103. The charge pump 204 first starts introduction into the linear speed during the decelerating process first at a high gain. After the introduction, the motor approaches the target transfer rate while proceeding with the changing linear speed with the deceleration of the motor.

At the point f1 where the motor 102 moderates the deceleration and enters a recordable linear speed area, the gain of the charge pump 204 is switched for proceeding with a linear speed at a low gain. At this point, to generate a stable storage clock, the PLL has to permit relatively slow response so as not to respond to the disturbance of a high frequency such as an extra pulse, etc. In addition, to generate a clock having small jitter, the loop gain of the PLL has to be appropriately reduced.

Furthermore, to store data on the optical disk 101, it is necessary to set the number of rotations of a motor to be a predetermined linear speed, for example, within ±5% of the standard linear speed, and also to set the linear speed change rate to approach 0. At this time, since the motor slowly changes its rotation, the operation can proceed with the change although the response of the PLL is not rapid. Therefore, the operation can proceed with slow response of the PLL. Therefore,the clock extract circuit 110 can operate as a stable PLL, and data can be stored stably.

The point f1 can be detected by the linear speed detection circuit 113. In the linear speed detection circuit 113, the period of the frequency-divided clock obtained by dividing the output clock of the VCO 206 by N can be measured by the counter A 208 using the fixed reference clock. For example, if the reference clock is set to 100 times the frequency of the frequency-divided clock at the standard transfer rate, then it can be determined that the linear speed has reached within 5% of the standard transfer rate when 95 to 105 reference clocks enter one period of the frequency-divided clock. The determination is made by the speed determination circuit 209.

In addition, the synchronization detection circuit 114 detects whether or not the PLL is in synchronism. It can be determined by checking whether of not the count value of the counter B 210, which counts the period of the binarized wobble signal using the output clock of the VCO 206, is nearly equal to N. This determination is made by the synchronization discrimination circuit 211.

As described above, the linear speed can also be detected by means for measuring the period of the binarized wobble signal extracted by the wobble extract circuit 109 using the reference clock 112 in addition to the detection of the linear speed by the linear speed detection circuit 113 as described above in this embodiment.

The linear speed can also be detected by means for measuring the interval of physical addresses for each sector assigned on the disk of DVD-RAM using the reference clock 112.

In addition, not only by the detection of a linear speed, but also by the computation of the transfer rate from the number of rotations of the motor obtained by measuring the rotation synchronization signal issued by the motor using the reference clock 112 and the current position in the radius direction of the optical head 103, the linear speed detection circuit 113 can be replaced. Even by speed-detecting in this method, the effect of the method according to this embodiment can be obtained.

In addition to the above mentioned procedure, the system can be configured such that data can be stored with the charge pump 204 set to a low gain when the system controller 108 issues a store instruction, or the charge pump 204 can be set to a low gain when the optical disk controller 107 outputs, or while it is outputting, storage data to the optical modulation means 111. In these cases, the effect similar to that described above can be obtained by setting the configuration such that the linear speed detection circuit 113 can detect that the linear speed has approached the standard transfer rate, and can start storing data.

According to this embodiment, the gain of the charge pump 204 is switched between two types, i.e., a high gain and a low gain. However, the switching operation can be performed on three or more settings. For example, when the PLL is introduced, a higher gain is set, and while maintaining a gain enough to proceed with the maximum acceleration/deceleration of the motor at the time of a proceeding state after the completion of the introduction, the gain is reduced by 1 level, during the storage, or when the linear speed enters a predetermined range close to the standard transfer rate, the gain is switched to a low gain enough to be able to proceed with the elements of a disk center error. Thus, in addition to the proceeding characteristic of the PLL, and the stable extracting of a clock, the PLL can be rapidly introduced, and access can be gained within a short time.

The present invention has been described above by referring to the wobbling using a DVD-RAM disk. However, the present invention is not limited to this application, and the similar effect can be obtained on a disk on which the physical length of a wobbling period is equally applied, the physical length of a wobbling period can be longer depending on the radius of a disk, etc.

What is claimed is:

1. An optical disk device for reading or storing data on an optical disk on which a reference signal of a frequency element is provided along a guide groove at a transfer rate, comprising:

rotation means for rotating the optical disk at an optional number of rotations;

rotation control means for controlling rotation of the optical disk;

frequency extract means for extracting a frequency element of the reference signal;

clock extract means for extracting a clock element from the reference signal;

linear speed detection means for detecting a linear speed of the optical disk; and response switch means for switching a response of said clock extract means, said device being configured that storage data to be stored on the optical disk is generated according to a clock output from said clock extract means, wherein when a linear speed detected by said linear speed detection means is within a predetermined range of linear speed at which data can be stored on the optical disk or when it is determined that the linear speed is within a predetermined range of linear speed change rate, the response of said clock extract means is set at a low speed.

2. An optical disk device for reading or storing data on an optical disk on which a reference signal of a frequency element is provided along a guide groove at a transfer rate, comprising:

rotation means for rotating the optical disk at an optional number of rotations;

rotation control means for controlling rotation of the optical disk;

frequency extract means for extracting a frequency element of the reference signal;

clock extract means for extracting a clock element from the reference signal;

rotations detection means for detecting a number of rotations of the optical disk; and response switch means for switching a response of said clock extract means, said device being configured that storage data to be stored on the optical disk is generated according to a clock output from said clock extract means, wherein when a number of rotations of the optical disk detected by said rotation detection means is within a predetermined range with respect to a target number of rotations, the response of said clock extract means is set at a low speed.

3. The optical disk device according to claim 1, wherein when the linear speed or the number of rotations of said optical disk is within a predetermined range, said rotation control means moderates an acceleration or deceleration speed of said rotation means, and simultaneously or later, the response of said clock extract means is switched to a low speed.

4. The device according to claim 1, wherein when the linear speed or the number of rotations of said optical disk is within a predetermined range, the response of said clock extract means is set at a low speed, and such data synchronous with the clock extracted by said clock extract means is stored on the optical disk.

5. An optical disk device for reading or storing data on an optical disk on which a reference signal of a frequency element is provided along a guide groove at a transfer rate, comprising:

frequency extract means for extracting a frequency element of the reference signal;

clock extract means for extracting a clock element from the reference signal; and response switch means for switching a response of said clock extract means, said device being configured that storage data to be stored on the optical disk is generated according to a clock output from said clock extract means, wherein the response of said clock extract means is set at a low speed only when the data is stored on the optical disk.

6. The optical disk device according to claim 1, wherein said response switch means has at least three types of responses.

7. The optical disk device according to claim 1, wherein the optical disk is configured that a track is sectioned into a plurality of zones in the radius direction, and the reference signal has an interval such that a physical length of one period is prolonged depending on the radius of the optical disk on which the data is read and stored.

8. The device according to claim 1, wherein an intervals of the reference signal is set such that a physical length of one period is constant throughout the optical disk on which the data is read and stored.

9. The device according to claim 1, wherein said reference signal is a wobbling continuously or intermittently applied along the guide groove of the optical disk, and an PLL circuit is provided for extracting from said wobbling a clock corresponding to the transfer rate.

* * * * *